US011467695B1

(12) United States Patent
Dean et al.

(10) Patent No.: US 11,467,695 B1
(45) Date of Patent: Oct. 11, 2022

(54) TOUCHSCREEN DISPLAY SYSTEM

(71) Applicant: Immersive Group Gaming Ltd, London (GB)

(72) Inventors: William Thomas Dean, London (GB); Jan Breens, London (GB)

(73) Assignee: Immersive Group Gaming Ltd, London (GB)

( * ) Notice: Subject to any disclaimer, the term of this patent is extended or adjusted under 35 U.S.C. 154(b) by 0 days.

(21) Appl. No.: 17/447,925

(22) Filed: Sep. 16, 2021

(51) Int. Cl.
| G06F 3/042 | (2006.01) |
| G06T 7/20 | (2017.01) |
| G01S 7/481 | (2006.01) |
| G01S 7/497 | (2006.01) |
| G01S 17/88 | (2006.01) |
| G06F 3/041 | (2006.01) |
| G06V 20/00 | (2022.01) |

(52) U.S. Cl.
CPC .......... *G06F 3/0421* (2013.01); *G01S 7/4814* (2013.01); *G01S 7/4817* (2013.01); *G01S 7/497* (2013.01); *G01S 17/88* (2013.01); *G06F 3/0418* (2013.01); *G06T 7/20* (2013.01); *G06V 20/00* (2022.01)

(58) Field of Classification Search
CPC ..... G06F 3/0421; G06V 20/00; G01S 7/4814; G01S 7/4817; G01S 7/497; G01S 17/88; G06T 7/20
USPC .......................................................... 345/173
See application file for complete search history.

(56) References Cited

U.S. PATENT DOCUMENTS

| 6,816,537 B2 * | 11/2004 | Liess | G06F 3/0423 345/173 |
| 9,191,665 B1 * | 11/2015 | Kurtz | G06F 3/0425 |
| 2010/0245292 A1 * | 9/2010 | Wu | G06F 3/0423 345/175 |

(Continued)

FOREIGN PATENT DOCUMENTS

| AU | 2019100933 A4 | 9/2019 |
| CN | 111240524 A | 6/2020 |

OTHER PUBLICATIONS

Combined Search and Examination Report issued in GB Patent Application 2108685.5, dated Jan. 24, 2022 in 5 pages.

*Primary Examiner* — Tom V Sheng
(74) *Attorney, Agent, or Firm* — Knobbe, Martens, Olson & Bear, LLP

(57) ABSTRACT

A frameless touchscreen display system comprises a frameless display screen; a display system arranged to render a moving image within a display area of the frameless display screen; an image rendering component configured to receive a detected touch input, determine an action associated with a location of the detected touch input within the display area, and modify the moving image to effect the associated touch action; a 2D lidar sensor positioned so that a detection plane of the 2D lidar sensor lies adjacent and substantially parallel to the frameless display screen; and a touch input detector coupled to the 2D lidar sensor and configured to: detect the touch input based on one or more object lidar returns from an object intersecting the detection plane at said location within the display area, and estimate said location within the display area based on (i) a return time and return angle of each object lidar return and (ii) a known position of the 2D lidar sensor relative to the frameless display screen.

20 Claims, 13 Drawing Sheets

(56) References Cited

U.S. PATENT DOCUMENTS

2018/0196576 A1 7/2018 Panneer et al.
2019/0317639 A1* 10/2019 Winkler .................. G01P 3/366

* cited by examiner

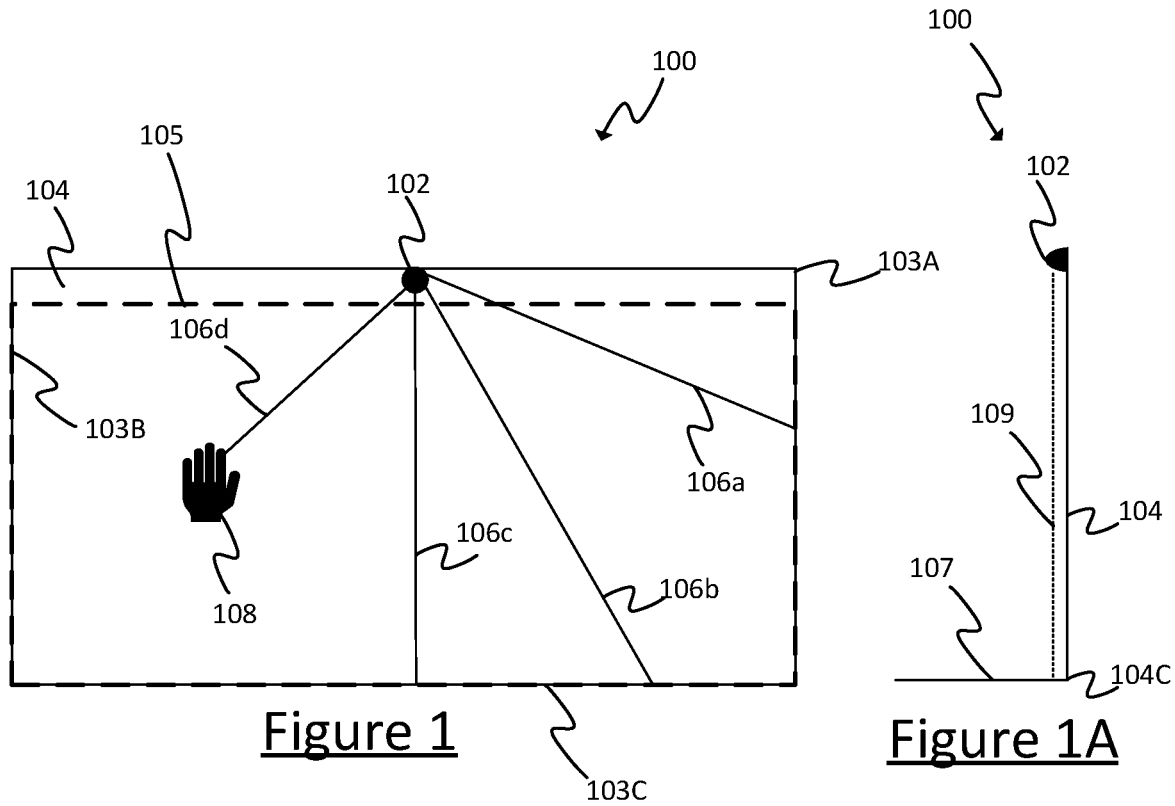
Figure 1
Figure 1A
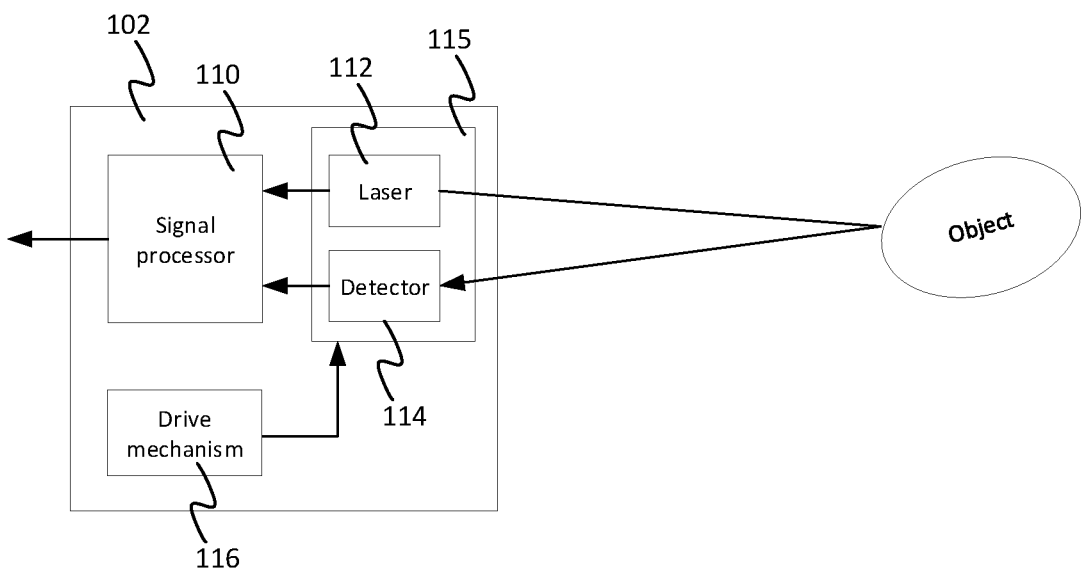
Figure 1B

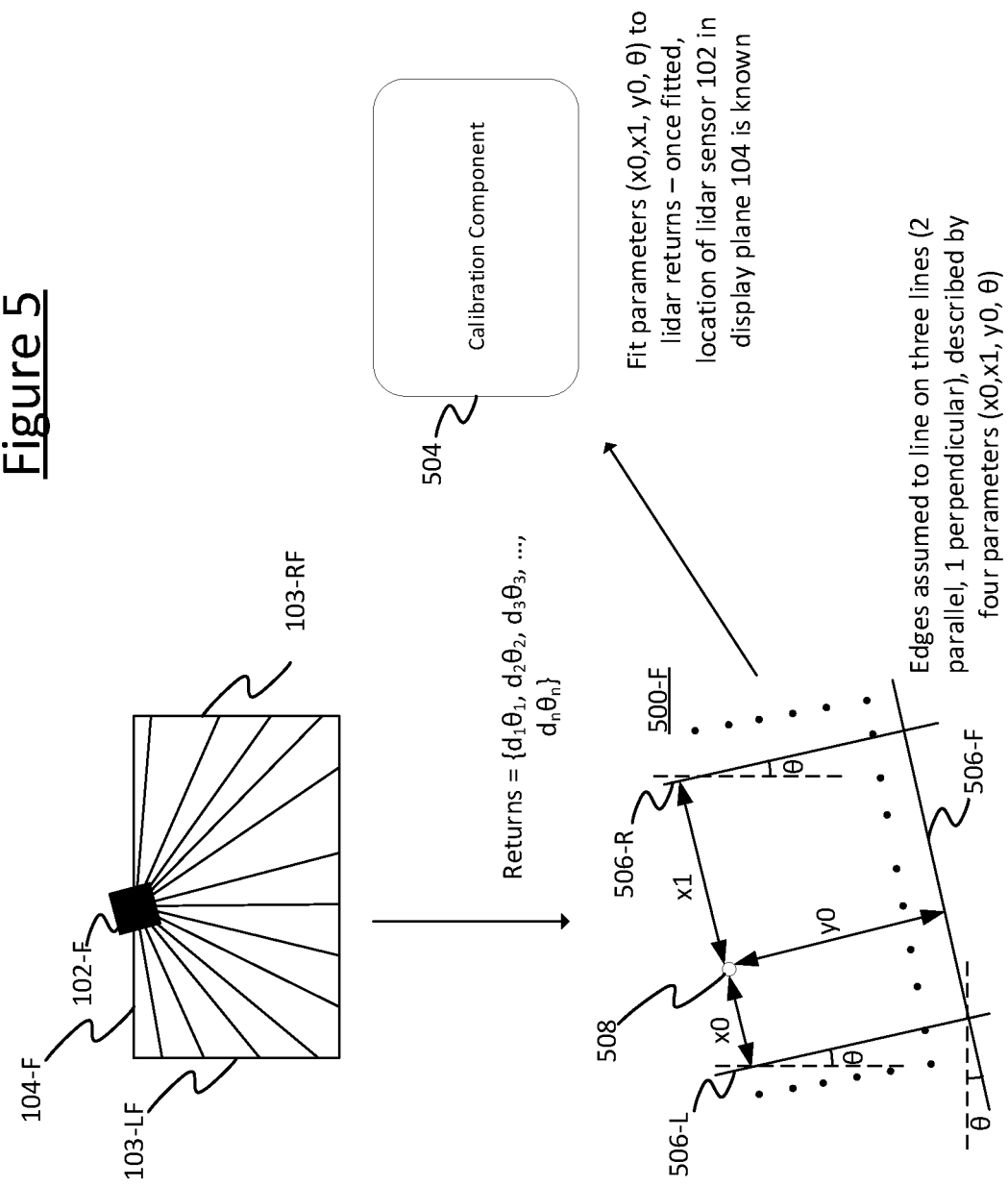

```
Slamtec RPLidar A2M8 M:40 Rv:6 Fw:1.28          PROJECTION CALIBRATED
Wall Index: 2 RIGHT WALL

SN: ED949A87C5E392D2A5E492F87D41316C

Calibrated
    Floor Angle       : 2.285156
    Floor Distance    : 2309mm
    Left Wall Offset  : 1679mm
    Right Wall Offset : 1668mm Sets of points Count:1

NormalisedPoint Count:1
    pos: -83 983   npos: 0.629761 0.410797   rad: 30.427336
```

Figure 5D

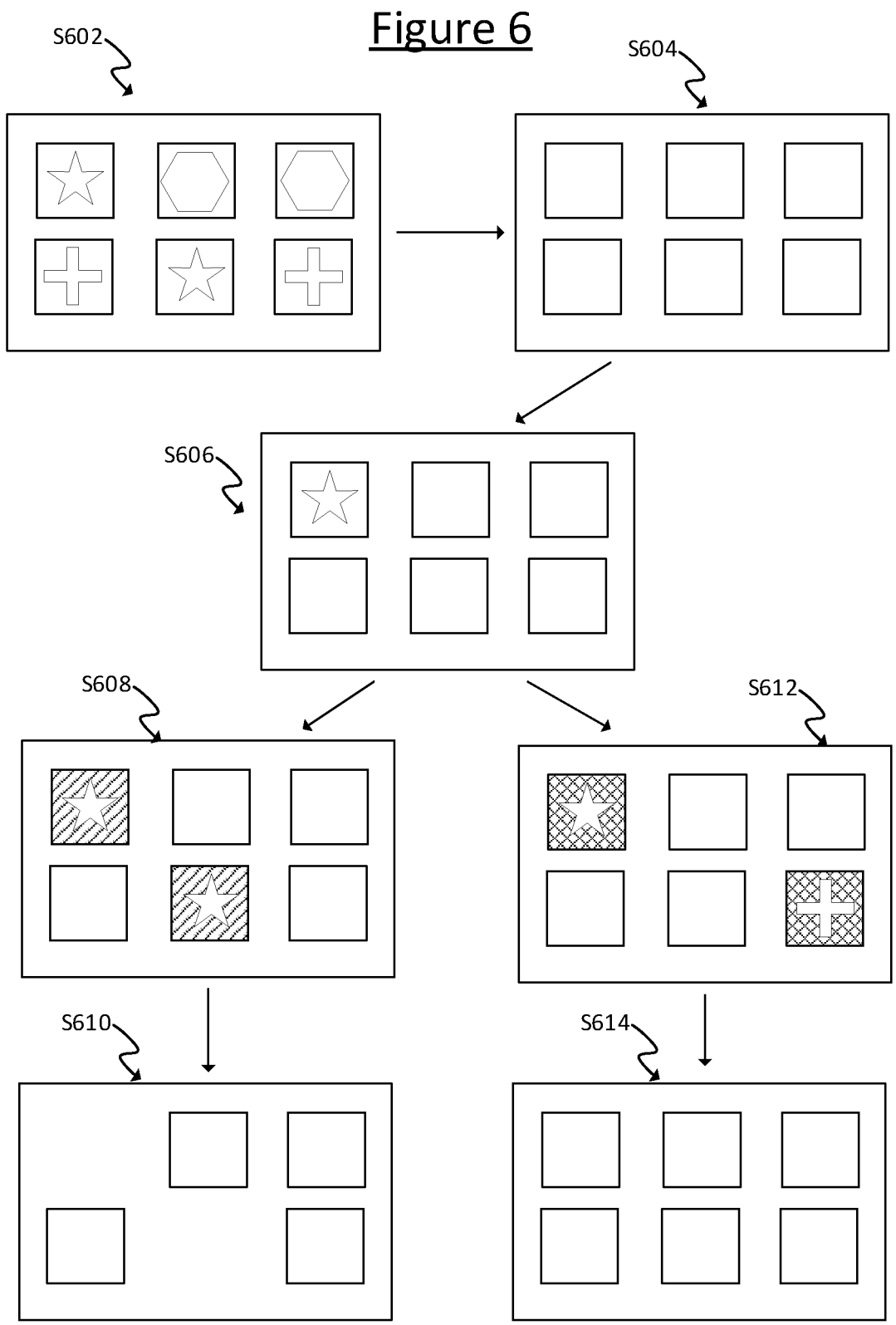

Figure 7

| Selected Element | Action | Score |
|---|---|---|
| First tile | Flip selected tile | 0 |
| Matching tile | Flip selected tile; turn both tiles green; remove both tiles from game environment | 10 |
| Non-matching tile | Flip selected tile; turn both tiles red; flip both tiles | -5 |

| Selected Element | Action |
|---|---|
| Play button | Play video |
| Pause button | Pause video |
| Search icon | Render search input interface |
| Hyperlink | Render linked image |

900

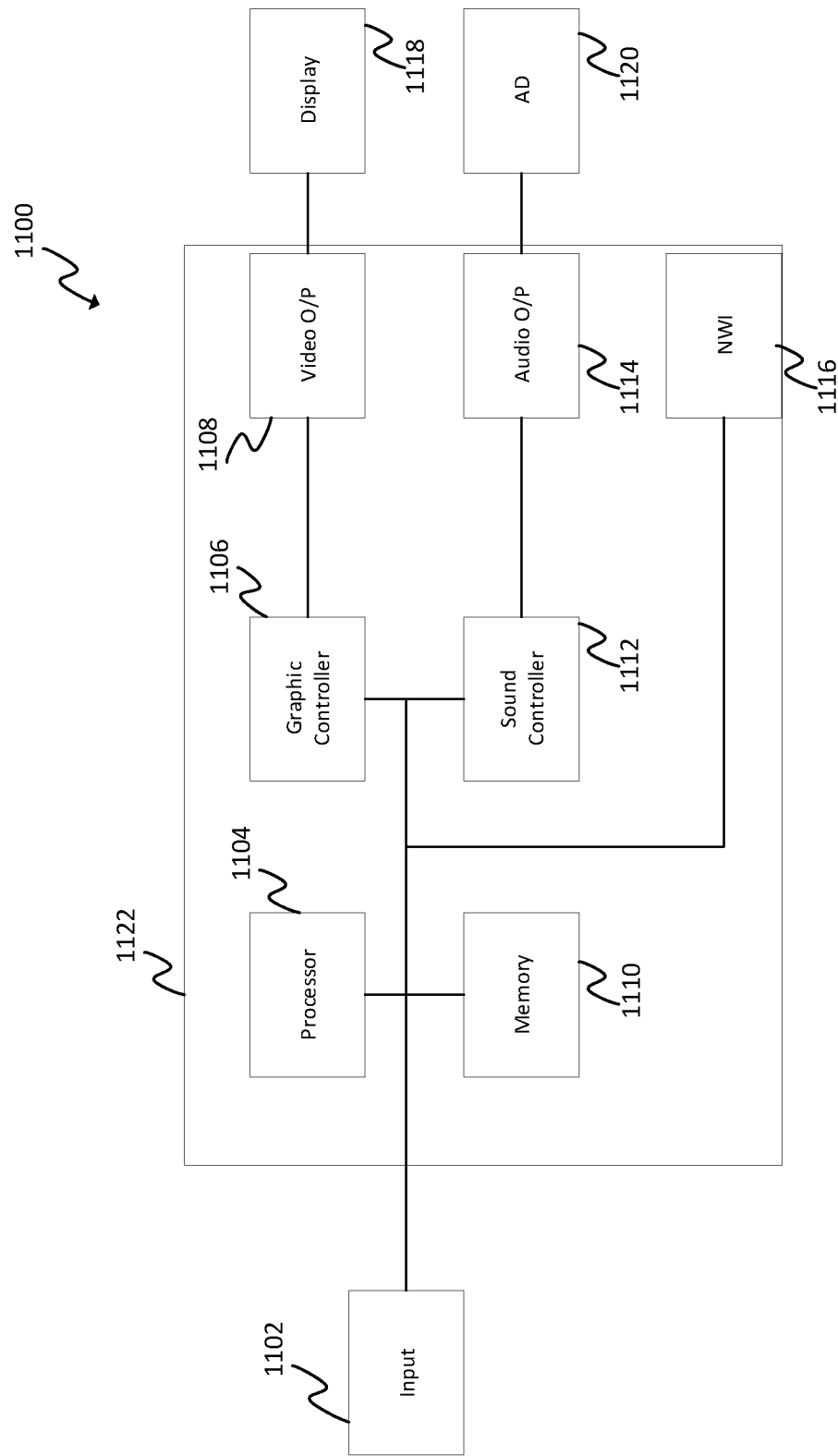

TOUCHSCREEN DISPLAY SYSTEM

TECHNICAL FIELD

The present disclosure relates to a touchscreen display system.

BACKGROUND

A touchscreen is a form of an input device for receiving a touch input and is typically used in conjunction with an output device for displaying an image. Touchscreens are widely used, for example in personal computing devices.

There are a variety of touchscreen technologies with different methods of sensing touch.

A resistive touchscreen panel has two electrically conductive layers of thin metal film separated by a thin air gap. The top layer has a coating on the underside surface, and the bottom layer has a similar resistive layer on its top. One layer has conductive connections along its sides, the other along top and bottom. A voltage is applied to one layer and sensed by the other. When an object presses down onto the outer surface of the top layer, the two layers touch to become connected at the point of touch, and so completing a circuit. The panel then behaves as a pair of voltage dividers, one axis at a time. By rapidly switching between each layer, the position of pressure on the screen can be detected.

Surface acoustic wave (SAW) technology uses a transmitter to generate ultrasonic waves that pass over the touchscreen panel. When the panel is touched, a portion of the wave is absorbed and a portion is reflected. The reflected wave is detected by piezoelectric receivers, and used to determine the location of the touch input.

A capacitive touchscreen panel consists of an insulator, such as glass, coated with a transparent conductor, such as indium tin oxide (ITO). Touching the surface of the screen with a fingertip results in a distortion of the screen's electrostatic field due to the conductivity of the human body, which is measurable as a change in capacitance. Different technologies may be used to determine the location of the touch based on the change in capacitance.

An infrared touchscreen uses an array of X-Y infrared LED and photodetector pairs around the edges of the screen to detect a disruption in the pattern of LED beams. The LEDs and photodetectors are arranged in a frame surrounding a display screen. When a touch input is provided at the screen surface, the LED beam pattern is disrupted, allowing the location of the touch to be determined. Strictly speaking, the display screen may not have to actually be touched to instigate a touch input via disruption of the beam pattern, but the beam pattern lies sufficiently close to the display screen to mirror the functionality of other types of touchscreen display. Touchscreen frames are typically a lower cost option, particularly for larger displays. A standalone frame can be used to "retrofit" a conventional display (e.g. large LCD screen or similar) with touchscreen functionality.

SUMMARY

In certain contexts, "frame-based" touchscreen systems (infrared touchscreen systems and the like) are currently the only viable option. There are practical limits on the maximum size of a single touch panel and, above this, multiple panels in a tiled arrangement would normally be required. For very large display areas (e.g. spanning an entire wall), touchscreen panels may be non-viable or at least prohibitively expensive. A frame may be more viable in this context, however, large frames are also relatively expensive. Moreover, such frames are typically a few centimetres thick, creating an unusable border region around the usable display area.

One example context considered herein is that of an image projector used to project an image on a display screen. It is desirable to be able to provide a touchscreen modality with such a projected image. A touchscreen panel would not be suitable in this context, as it would make the surface more reflective (and a panel might, in any event, not be viable if the image is large). A touch screen frame might be more suitable, as the image could be projected onto the display screen within the boundaries of the frame, but with the drawbacks note above.

An aim herein is to prove a touchscreen display system that can be used when traditional touchscreen panels are unsuitable or undesired, without the use of a touchscreen frame. A frameless touchscreen display system has the benefit that an image can be displayed "edge-to-edge" across the display screen. One application of the present system is to provide touchscreen modality with a projected image. However, the present system can be applied more generally, both with real images and virtual images (e.g. in an augmented reality context), to convert any 'passive' surface to a useable touchscreen without the need for a panel or frame. The present system can also be implemented using relatively inexpensive equipment in comparison to large touchscreen frames and panels.

One context addressed herein is that of multiple display screens, such as two adjacent walls onto which respective images are projected or otherwise rendered. The present approach allows the images to be displayed on the adjacent walls edge-to-edge, with each wall acting as a touchscreen, and image content moving seamlessly and unbroken between the images. This edge-to-edge arrangement would not be possible if touchscreen frames had to be mounted on each wall.

A first aspect of the present disclosure provides a frameless touchscreen display system, comprising:
  a frameless display screen;
  a display system arranged to render a moving image within a display area of the frameless display screen;
  an image rendering component configured to receive a detected touch input, determine an action associated with a location of the detected touch input within the display area, and modify the moving image to effect the associated touch action;
  a 2D lidar sensor positioned so that a detection plane of the 2D lidar sensor lies adjacent and substantially parallel to the frameless display screen; and
  a touch input detector coupled to the 2D lidar sensor and configured to: detect the touch input based on one or more object lidar returns from an object intersecting the detection plane at said location within the display area, and estimate said location within the display area based on (i) a return time and return angle of each object lidar return and (ii) a known position of the 2D lidar sensor relative to the frameless display screen.

The moving image may be a real moving image, e.g. projected onto the display area. Alternatively, the image may be a virtual image, e.g. the display system could be an augmented reality system configured to render a virtual image that is perceived by the user within the display area.

The display system may be arranged so that the display area extends all the way to an outer edge of the frameless display screen.

The outer edge of the frameless display screen may meet a second surface extending outwardly from the frameless display screen, such that the display area extends all the way to the second surface.

The frameless touchscreen display system may comprise a calibration component configured to detect an intersection of the second surface with the detection plane of the 2D lidar sensor based on a set of calibration lidar returns from the second surface, and determine said known position of the 2D lidar sensor from the detected intersection, wherein lidar returns from the second surface are disregarded in detecting touch input.

The frameless display screen may be a first frameless display screen and the display area may be a first display area. The second surface may be a second frameless display screen, on which the display system is configured to display a second moving image (real or virtual) in a second display area that extends to meet the first display area at said outer edge of the first frameless display screen.

The frameless touchscreen display system may comprise a second 2D lidar sensor positioned so that a second detection plane of the second 2D lidar sensor lies adjacent and substantially parallel to the second frameless display screen, the touch input detector coupled to the second 2D lidar sensor for detecting a touch input within a location of the second display area based on a known position of the second 2D lidar sensor.

The calibration component may be configured to detect a second intersection of the first frameless display screen with the second detection plane of the second 2D lidar sensor based on a second set of calibration lidar returns from the first frameless display screen, and determine said known position of the 2D lidar sensor from the detected second intersection.

The display system may be arranged so that the display area extends all the way to at least two or three outer edges of the frameless display screen.

The calibration component may be configured to detect respective intersections of the two or three outer edges with the detection plane based on respective sets of lidar returns from at least two or three second surfaces extending outwardly from said two or three outer edges of the display screen.

The frameless touchscreen display system may comprise at least one image capture device; and a motion capture component coupled to the at least one image capture device configured to detect and track one or more known target objects in image data received from the at least one image capture device. The image rendering component may be configured to modify the moving image based on the detected touch input and the tracking of the known target objects.

The at least one image capture device and the motion capture component are arranged to track the known target objects in a horizontal plane, the frameless display screen extending upwards from the horizontal plane, whereby the moving image is controllable via a combination of touch input at the first frameless display screen and movement of the known target objects within the horizontal plane.

The image rendering component may be configured to display the first and second moving images as adjacent portions of a single larger image, the display system calibrated such that the single larger image spans the first and second display areas unbroken, with image content moving between the first and second moving images.

The moving image may a real moving image displayed within the available display area. For example, the display system may comprise an image projector positioned to project the moving image onto the display area of the frameless display screen.

Alternatively, the moving image may be a virtual image perceptible to at least one user within the available display area. For example, the display system may comprise an augmented reality (AR) system configured to render the appearance of the image on the wall to a user of the AR system.

The touch input detector may be configured to fit a predetermined shape to the object lidar returns, and the touch input may be detected by determining that the predetermined shape satisfies one or more touch detection criteria. For example, the one or more touch detection criteria require a size of said shape to exceed a minimum size without exceeding a maximum size.

A second aspect of the present disclosure provides a computer system comprising:

a touch input detector for coupling to a 2D lidar sensor positioned so that a detection plane of the 2D lidar sensor lies adjacent and substantially parallel to a surface, wherein the touch input detector is configured to detect touch inputs for interacting with interactive elements rendered by an interactive application component, the interactive elements represented in an interaction coordinate system;

wherein the touch input detector is configured to:

detect a touch input at the surface based one or more object lidar returns from an object intersecting the detection plane, estimate a location of the touch input relative to the surface based on (i) a return time and return angle of each object lidar return and (ii) a known position of the 2D lidar sensor relative to the surface, and provide, to the interactive application component, coordinates of the detected touch input in said interaction coordinate system, the coordinates determined by estimating the location of the touch input relative to the surface.

The touch input detector may be configured to estimate the location of the touch input in a coordinate system of said surface based on (i) and (ii), and transform the location of the touch input in the coordinate system of the surface to the coordinates in the interaction coordinate system based on a known transformation between the surface coordinate system and the interaction coordinate system.

Alternatively, the interactive elements may be represented in a coordinate system of the surface directly, the interaction coordinate system being the coordinate system of the surface.

The computer system may comprise a display system configured to render an image (real or virtual) of the interactive elements on the surface.

The computer system may comprise a 2D lidar sensor coupled to the touch input detector and positioned so that the detection plane of the 2D lidar sensor lies adjacent and substantially parallel to a surface for detecting touch inputs at the surface.

A third aspect herein provides method of calibrating a 2D lidar sensor, the method comprising:

processing a set of calibration lidar returns detected by the 2D lidar sensor, in order to estimate a position of the 2D lidar sensor relative to first surface;

wherein the 2D lidar sensor is assumed to be positioned such that a detection plane of the 2D lidar sensor lies adjacent and substantially parallel to the first surface for detecting touch input at the first surface, with at least one second surface extending outwardly from at least one outer edge of the first surface such that the second surface intersects the detection plane, wherein the position of the 2D lidar sensor is estimated by fitting at least one line or curve to the calibration lidar returns in a frame of reference of the 2D lidar sensor, the line or curve representing the intersection(s) between the first and second surface(s).

The method may comprise:

causing a display system to render multiple visible elements on the first surface, the multiple visible elements having known coordinates in an interaction coordinate system;

detecting a calibration touch input at each of the multiple visible elements, the calibration touch input detected as one or more object returns from an object intersecting the detection plane at a location of the visible element;

determining surface coordinates of each touch input in a coordinate system of the first surface, based on the estimated position of the 2D lidar sensor relative to the first surface;

using the surface coordinates of each touch input to determine a transformation from the surface coordinate system to the interaction coordinate system, based on the known coordinates of each visible element.

The visible elements may be projected onto the visible display area by at least one image projector of the display system, said transformation for compensating for any angular misalignment between the image projector and the first surface.

A further aspect herein provides a computer program embodied in transitory or non-transitory media, and configured when executed by one or more computer processors, to implement the method or touch input detector of any of the above aspects or any embodiment thereof.

As with touchscreen frames, strictly speaking, the above aspects and embodiments may not require the applicable surface to actually be touched in order to trigger a touch input. A touch input is triggered by an object intersecting the detection plane close to the surface.

BRIEF DESCRIPTION OF THE DRAWINGS

Embodiments will now be described by way of example only with reference to the accompanying drawings, in which:

FIG. 1 is a schematic frontal view of a touchscreen device according to an embodiment of the present disclosure;

FIG. 1A shows a schematic side view of the system of FIG. 1;

FIG. 1B shows a highly schematic block diagram of a typical lidar scanner;

FIG. 5 is a schematic diagram illustrating the steps of the process of FIG. 4;

FIG. 5D shows a set of lidar returns, in which a touch input has been detected;

FIG. 6 shows an example interactive game provided using the touchscreen device;

FIG. 7 shows an example database for implementing the interactive game;

FIG. 9 shows an example database for implementing the interactive video playback experience;

FIG. 11 is a schematic diagram of a computer device for implementing aspects of the system.

DETAILED DESCRIPTION

Figure 2:
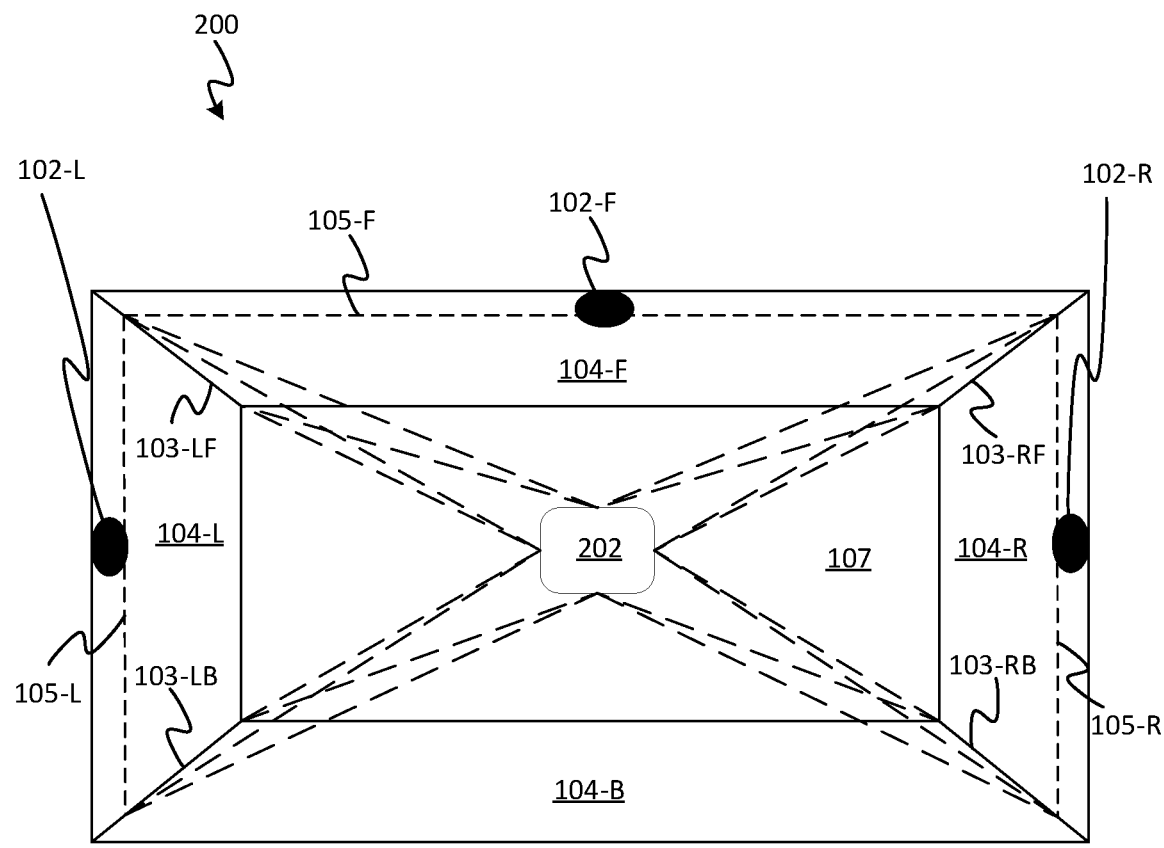
FIG. 2 is a schematic diagram of a room for providing an interactive user experience.

FIG. 1 shows an arrangement referred to herein as a "lidar touchscreen" 100. The lidar touchscreen 100 comprises a lidar scanner 102 and a surface 104 that is used as a display screen. The lidar scanner 102 is positioned on the display screen 104 such that it can scan the surface of the display screen 104. A display area 105 is depicted which, in the present example, extends all the way to at least three out of four outer edges 103A-C of the display screen 104. In the examples below, the display screen 104 is a wall, with the display area 105 extending to both horizontal edges of the wall 103A, 103B (where the wall meets the two adjacent walls) and the lower edge 104B (where the wall meets the floor), and the display area 105 is defined by an image projector as a region in which the image projector is capable of projecting a real image on the wall. However, it will be appreciated that the system can be implemented with other forms of display screen and display system. In general, a display screen refers to any surface and a display system refers to any system capable of rendering an image (real or virtual) on that surface.

More generally, the described techniques allow touchscreen functionality to be provided for any surface 104—whether or not any image is displayed or otherwise rendered visible on the surface—by mapping lidar object detections to coordinates on the surface 104. To this end, the lidar sensor 102 is calibrated such that its position relative to the surface 104 is known, which in turn allows a location of a detected object to be determined in (x,y) cartesian coordinates on the surface 104. In the described examples, an object detection satisfying predetermined object size constraints (minimum and maximum) triggers a touch input at the location of the detected object. A multi-stage transformation is described, in which first (x,y) coordinates of the touch input are initially determined in a normalized coordinate system of the surface 104. The normalized coordinate system is a "scale invariant" coordinate system, e.g., with (0,0) representing a top-left corner of the surface, and (1,1) representing a bottom right corner of the surface, although it will be appreciated that a normalized surface coordinate system can be constructed in other ways. Object detections are transformed to the normalized coordinate system based on measured distances from the lidar scanner 102 to the three outer edges 103A-C and a measured orientation of the lidar scanner 104 relative to the outer edges 103A-C. Whilst convenient, normalized coordinates are not required; more generally, a known position of the lidar sensor 102 is used to locate lidar detections on the surface 104 (that is, in a coordinate system of the surface 104). The first (e.g. normalized) (x,y) coordinates are then transformed to an "interaction coordinate system" to provide second (x,y) coordinates of the touch input in the interaction coordinate system. The interaction coordinate system is a coordinate system used by an interactive application, such as a game (or component thereof, such as a game engine) to represent element(s) that the user can interact with via touch input. In other words, the interaction coordinate system is a coordinate system in which an interactive environment is represented by the application component (such as pixel coordinates, or any other coordinate system used to describe the interactive environment). The first and second coordinates may be referred to as surface coordinates and game coordinates respectively (although the description applies equally to other types of interactive application). When used in conjunction with an image projector, the multi-stage transformation can compensate for image distortion caused by angular misalignment of the image projector relative to the surface 104. However, the multi-stage transformation is not required in all contexts: for example, the interactive elements could be represented directly in terms of surface coordinates, in which case the second transformation is not required because coordinates on the surface 104 are directly interpretable by the interactive application. A surface, such as a wall, equipped with touch functionality in this manner may be referred to herein as an "interactive surface".

Lidar scanners 102 are known in the art and therefore will not be described in extensive detail herein. During use, a laser of the lidar scanner 102 produces a laser beam 106a, 106b, 106c, 106d and measures the time for the reflected light to return to a receiver of the lidar scanner 102 (return time or "time-of-flight"). The time to return is then used to calculate a distance from the lidar scanner at which the light was reflected. The lidar scanner 102 may be equipped with a single or multiple scanning lasers, hence reference numerals 106a-106b may denote a single laser beam at different time instants, or multiple laser beams. Typically, a beam(s) 106a-d in the infrared or near-infrared spectrum would be used, such that the beam(s) 106a-d are non-visible to the human eye.

FIG. 1B shows a highly schematic block diagram of a typical lidar scanner, shown to comprise a laser 112 and a detector 114 coupled to signal processing logic 110. The signal processing logic 100 can be implemented at the hardware level in any suitable manner, e.g. as a DSP microcontroller, FPGA or in dedicated signal processing circuitry etc. The laser 112 is a pulse laser, which emits laser pulses at regular intervals and signals the emission of each pulse to the signal processing logic 110. The detector 114 is collocated with the laser 112 for detecting any reflection of the laser pulse from an object. Any such detection is signalled to the signal processing logic 110, allowing the latter to compute the return time as the difference between the time the emission was signalled by the laser 112 and the time the detection was signalled by the detector 114. In some contexts, this calculation may be referred to as a time-to-digital (TDC) conversion or, more generally, a time-of-flight calculation. Typically, the lidar sensor 102 actually provides a return angle "bucket" (angular range, e.g. of a few arc seconds). The term "return angle" is used in a broad sense, and could mean an angle bucket depending on the configuration of the lidar sensor 102.

The laser 112 and detector 114 are coupled to a rotatable section 115 of the lidar scanner 102, which, in use, is caused to rotate by a drive mechanism 116 of the lidar scanner 102. The lidar scanner 102 records and reports the relative angle at which each laser pulse was emitted (return angle). Therefore, for each laser beam 106a, 106b, 106c, 106d emitted from the lidar scanner 102 that is reflected back to the lidar scanner 102, a lidar return provides polar coordinates (d, θ) of the point of reflection, where d is the distance of the object on which the light is reflected that can be calculated from the return time based on the known speed of light, and θ is the angle at which the laser beam was emitted.

The lidar scanner 102 depicted in FIG. 1 is a 2D lidar scanner, which means the laser(s) scan is in a 2D plane (the detection plane) for detecting physical structure that intersect the detection plane. The lidar scanner 102 is arranged so that the detection plane lies adjacent and substantially parallel to the display screen 104.

FIG. 1A shows a side view of the system 100, with the detection plane denoted by reference numeral 109. The floor is denoted by reference numeral 107, and the detection plane 109 extends from the lidar sensor 102 down to the floor 109. In the present example, the display area 105 is located below the lidar sensor 102, and the aim is to provide touchscreen functionality within that region, thus only returns from below the lidar sensor 102 are considered (this may, however, vary dependent on the application). The detection plane 109 lies slightly in front of the display screen 104 and any object intersecting the display plane 109 within the display area 105 may result in the detection of a touch input (the object does not necessarily have to actually touch the display screen 104, although the gap between the detection plane 109 and the display screen 104 is typically chosen to be small enough that this is not readily apparent in use). Whilst the lidar scanner 102 is shown to be mounted on the display screen 104 in FIGS. 1 and 1A, the lidar scanner 102 can be otherwise located to position the display plane 109 in the depicted manner (e.g. it could be mounted on the ceiling, or located in a recess in the floor with the display area 105 and detection plane 109 located above the lidar sensor 102 in that event etc.).

The lidar scanner 102 is used to detect touch input at the display screen 104, based on return time and return angle, without the use of a frame. A return from an object within the display area 105 containing an image is used to generate to a touch input, by transforming the return time and return angle to cartesian coordinates within the display area 105, using knowledge of the position of the lidar scanner 102 relative to the display screen 104. The cartesian coordinates could be expressed, e.g., in units of distance (e.g. meters, centimetres, millimetres etc.), units of image pixels, in "normalized" coordinates (see below), or in any other way relative to some known reference point in the display area 105 or, more generally, on the display screen 104 (e.g. a center point or corner point of the display area 105 or display screen 104). As described in further detail below, in the present example, multiple transformations are applied between multiple cartesian (x,y) coordinate systems. In any event, the known position of the lidar scanner 102 allows a lidar return(s) from an object intersecting the detection plane to be mapped to a location within the image, which in turn allows any touch action associated with that image location to be instigated.

The display screen 104 is substantially flat so that the laser beams 106a, 106b, 106c, 106d can provide coverage of the entire display area 105, absent any obstructing object (such as a user's hand).

During use, an image is displayed within the display area 105 of the display screen 104. The image is a touch-controlled moving image that provides an interactive user experience, and provides user selectable (or otherwise interactive) elements which, when selected (or otherwise interacted with) by a user via touch input, result in an action being triggered. In the examples below, the display screen 104 is a wall of an "interactive" cuboid room, and the image is projected onto the wall so as to occupy the available display area. As indicated, in this set-up, the available display area 105 extends to the two vertical edges 103A, 103B and lower horizontal edge 104B of the wall 104, and images are also projected onto at least one of the adjacent walls equipped with the same touchscreen functionality. Each such wall is said to operate as a "lidar touchscreen". The described set up allows images to be displayed "edge-to-edge". In general, an "edge-to-edge" set up refers to two or more non-parallel display screens configured in the manner of FIGS. 1 and 1A, where a first of the display screens meets a second of the display screens, and the display area 105 of each of those display screen extends all the way to the edge at which it meets the other display screen to provide an essentially continuous, touch-controllable display area extending across the non-parallel display screens.

In the examples below, the room is made interactive through a combination of touch input and motion capture that drives an interactive application (such as a game).

Figure 10:
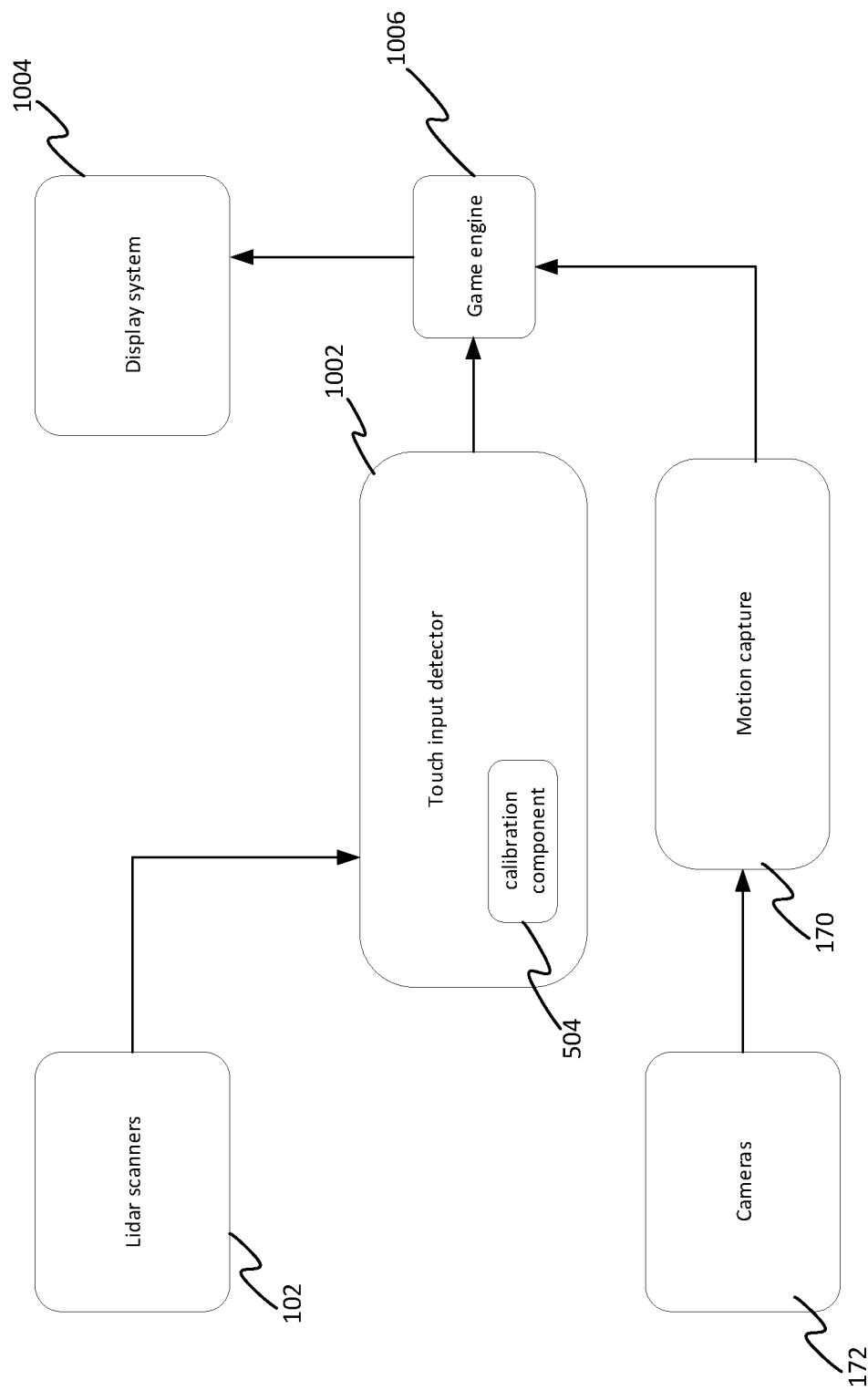
FIG. 10 is a schematic diagram of a system for implementing the touchscreen device.

FIG. 10 shows a schematic functional block diagram of a computer system incorporating lidar touchscreen functionality, which is described in detail below. For now, suffice it to say that the system comprises a touch input detector 1002 that received and processes lidar returns from the lidar sensor 102, and a game engine 1006 that receives and actions detected touch inputs from the touch input detector 1002 to deliver an interactive visual experience (a game in the examples below). The game engine 1006 acts as an image rendering component to render and update images containing interactive game elements.

Returning to FIGS. 1 and 1A, a user selects a selectable element by way of a user touch 108 at a location of the selectable element on the display screen 104. That is, the user touches the location of the display screen 104 at which the selectable element is displayed (or, more precisely, causes their hand or another object to intersect the detection plane 109 at that location). In areas of the display screen 104 at which there is no user touch 108 provided, the laser beams 106a, 106b, 106c projected in those directions may be reflected by one or more of the outer edges 103A-C of the display screen 104, depending on the reflective properties of the adjacent surfaces. In the examples below, the walls of the room are light coloured and the floor is mainly dark coloured, resulting in strong returns from the adjacent walls extended outwardly from edges 103A and 103B, but limited returns from the floor extending out from edge 104B (see FIGS. 5A-C).

When a user touches the display screen 104, the laser beam(s) 106d which are projected from the lidar scanner 102 in the direction of the user touch 108 are reflected by the user touch 108, creating one or more lidar returns back to the lidar sensor 102 (object returns).

In this instance, the time taken for the light to return to the lidar scanner 102 is shorter than when no user touch 108 is provided (i.e. shorter than the return time to one of the adjacent walls or the floor, as applicable). The distance of the user touch 108 is determined based on the return time. Since the angle of the beam 106d is also known, the location of the user touch 108 relative to lidar scanner 102 can be determined. Lidar inherently denotes polar coordinates (d, θ), in a frame of reference with the lidar scanner at the origin. When the position of the lidar scanner 102 on the wall is known, those coordinates can be mapped to location within the image occupying the available display area, thus providing an actionable touch input for the image. The touch input is provided to the game engine 1006, which in turn is able to match the touch input to any touch-selectable input at that location. As noted, this may involve multiple transformations of the coordinates, to provide the coordinates of the touch inputs in a way that is interpretable to the game engine 1006.

FIG. 2 shows an interactive room 200 comprising four walls, three of which are rendered interactive in the above sense (front, left, and right walls 104-F, 104-L, 104-R) via appropriately-located lidar sensors 102-F, 102-L, 102-R. In other implementations, one, some or all the walls of the room 200 (e.g. one, two, three, or four walls) may be interactive.

Respective images are projected onto respective display areas 105-L, 105-F, 105-R of the three interactive walls 104-L, 104-F, 104-R using an arrangement of image projectors 202 positioned at or near the ceiling of the room 200. By placing the projectors 202 in this position, users of the lidar touchscreens 100 can move freely in the room without blocking, or colliding with, the projector 202.

The images provided to the interactive walls 104-L, 104-R, 104-F of the room 200 may correspond to the same interactive environment. For example, in a game environment using a gameboard, the gameboard may cover some or all of the three display screens 104 of the room 200. More generally, interactive game elements can be rendered on the interactive walls, and pass freely between the walls in a seamless manner (with the three images being adjacent portions of a single, larger game image that spans the three interactive walls 104-L, 104-F, 104-R). Since the user touch 108 is detected by a single lidar sensor 102 for each display screen 104, rather than by a sensor system located in a border of the display as is known in the art, the interactive environment provided over multiple walls of the room 200 appears continuous, and thus the experience is more immersive for the user.

A fourth (back) wall 104-B is 'passive' in the present example. Each of the display areas 105-L, 105-F, 105-R extends down to the floor 107. The front wall 104-F meets the left and right walls 104-L, 104-R at first and second outer edges 103-LF and 103-RF respectively, and the back wall 104-B meets the left and right walls 104-L, 104-R at third and fourth outer edges 103-LB and 103-RB respectively. The front display area 105-F extends between the first and second outer edges 103-RF, 103-LF thereof, and the left and right display areas 105-L, 105-R extend between the first and third outer edges 103-FL, 103-LB and second and fourth outer edges 103-RF, 103-RB respectively, in an edge-to-edge fashion, to provide a single and essentially continuous display area spanning the three interactive walls 104-L, 104-F, 104-F, all the way to the back wall 104-B.

Each of the interactive walls 104-L, 104-F, 104-R is configured in the manner of FIGS. 1 and 1A with respect to the corresponding lidar sensor 102-L, 102-F, 102-R. From the perspective of the front wall 104-F, the first edge 103-LF corresponds to the left horizontal edge 103B in FIG. 1, whilst from the perspective of the left wall 104-L, the first edge 103-LF corresponds to the right horizontal edge 103A etc.

Figure 3:
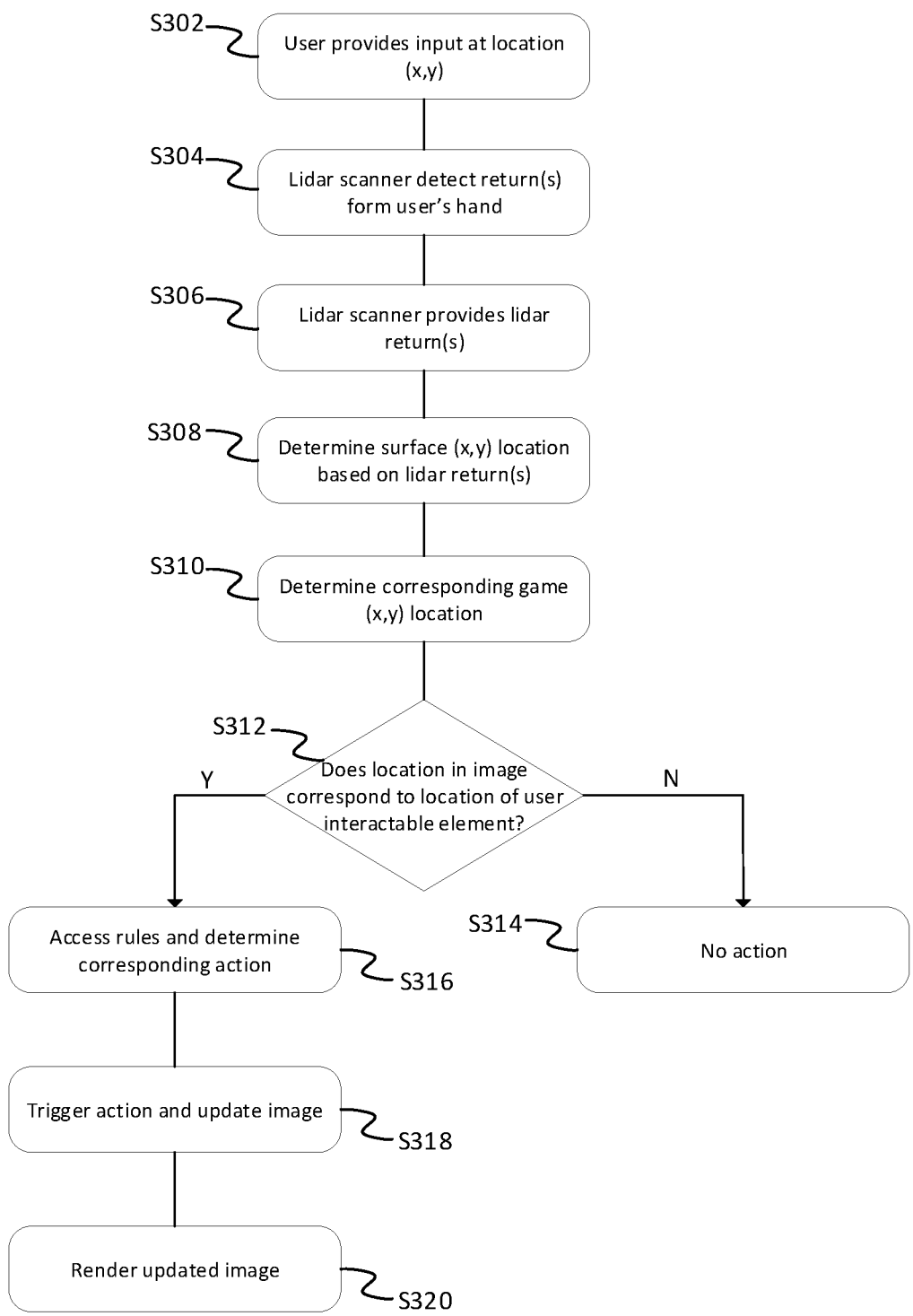
FIG. 3 is a flow diagram of an example process for locating a user input at the touchscreen device.

FIG. 3 shows an example process for implementing actions in the interactive experience.

At step S302, the user provides an input at a location on the display screen 104. This input is provided by way of user touch 108 or by some other objects, such as a stylus, touching the surface of the display screen 104 (or, more precisely, intersecting the detection plane 109 of the lidar scanner 102).

The lidar scanner 102 detects one or more returns from the user touch 108 (e.g. the user's hand) at step S304. It will be appreciated that the lidar scanner 102 continuously scans the detection plane 109 in order to be able to detect a user touch at any time.

The lidar scanner 102 provides the lidar return corresponding to the user touch 108 at step S306. This return is provided to the touch input detector 1002, which transforms the lidar returns to a touch input for actioning by the game engine 1006. Whilst the following description refers to a single lidar return from an object (e.g. user's hand), it will be appreciated that multiple returns may be detected and processed from the object, and aggregated to provide a single touch input when the multiple returns are determined to belong to the same object.

Whilst step S304 considers a return from a user touch 108, the lidar scanner 102 provides all lidar returns to the touch input detector 1002, i.e. all lidar returns irrespective of whether a user touch 108 is detected or not. However, not all lidar returns necessarily trigger a touch input. In the present example, individual lidar returns are converted to an (x,y) coordinate representation. For example, each lidar return could be transformed to the normalized coordinate system of the surface, although it is not necessary to transform the lidar returns to (x,y) surface coordinates for this purpose; blob detection would be applied in any (x,y) coordinate system (e.g. by simply converting the return time and return angle to (x,y) coordinates in units of distance, meaning the lidar points are represented in a non-normalized coordinate system, with the lidar sensor 102 at the origin). In this manner, individual lidar returns are transformed to (x,y) points (lidar points). In particular, lidar returns from the adjacent surfaces (walls, floor and/or ceiling) are ignored for the purpose of detecting touch input. The present techniques apply a form of "blob detection" to the (x,y) lidar points. Any two lidar points within some threshold distance of each other are determined to belong to a common object (or, more generally, lidar points are clustered into object groups using an appropriate clustering technique). Then, for each set of points determined to belong to a common object, a circle (or other predetermined shape) is fitted to those points. A touch input detection is triggered only if the radius of the circle is greater than a minimum radius, but less than a maximum radius. The minimum and maximum radius are examples of touch input conditions that may be tuned to approximately match the scale of a human hand. These limits provide robustness to 'spurious' detections that do not actually result from objects of the expected size (e.g. reflections caused by opening a door to the room). This same mechanism could be used to exclude lidar returns from the adjacent surfaces (as these would be grouped as much larger objects above the maximum radius), although such returns could also be excluded based on the known positions of those surfaces relative to the lidar scanner. That is to say, the touch input detector 1002 may additionally filter-out the lidar return from the adjacent walls and floor, so that touch input are only instigated by a lidar return(s) from an object within the area defined by the adjacent walls and floors (object return). For example, the touch input detector 1002 may determine which, if any, of the lidar returns have a distance value less than that corresponding to the display screen boundary for the corresponding angle of the lidar return. Alternatively, the touch input detector 1002 may determine a location of all of the lidar returns on the display screen 104, and use the determined locations to isolate the location of the user touch 108.

Further details of the touch detection process are described below with reference to the examples of FIGS. 5A-D.

If any object lidar returns are detected, the touch input detector 1002 determines (S308-310) a touch input comprising the location (x,y) of the user touch 108 on the display screen 104. As noted, this location is derived from knowledge of the position of the lidar sensor 102 relative to the wall 104. FIG. 3 considers a multi-stage process, in which the return time and return angle of the lidar return(s) is first converted to normalized cartesian coordinates on the wall 104 (S308), and then to pixel coordinates in the image (S310). However, the lidar coordinates can alternatively be converted to pixel coordinates directly. In some implementations, more than two coordinate system might be used. For example, blob detection could be applied in a non-normalized (x,y) coordinate system of the lidar sensor 102 (with the lidar sensor 102 at the origin) to locate a detected object(s) in that coordinate system. The location of any detected object(s) satisfying the touch input conditions(s) (e.g. the center point of a circle fitted to a cluster of object points) may then be transformed to normalized (or non-normalized) surface coordinates (e.g. with a corner or center point of the surface 104 as the origin), and the surface coordinates may then be transformed to (x,y) game coordinates.

Once the location of the user input 108 is known in game (x,y) coordinates, the game engine 1006 then determines the action to be triggered based on the location of the user input, of which steps S312 to S320 provide an example method.

At step S312, the game engine 1006 determines whether the (x,y) location of the touch input corresponds to a user selectable element. As discussed above, the interactive user environment comprises user selectable elements, such as game pieces in a game environment. However, the interactive user environment also provides areas which are not user selectable, such as empty spaces or "locked" elements, which the user may, for example, have to unlock through gameplay or by logging in to a user account.

If it is determined that the user input is not at the location of a user selectable element, no action is triggered, step S314.

If, however, the user input is associated with a user selectable element, a set of rules associated with the interactive user environment is accessed to determine a corresponding action, step S316.

At step S318, the determined action associated with the user input is triggered and the image updated accordingly. This updated image is displayed on the display screen 104 at step S320. The user can then provide a further input, S302, corresponding to the updated image.

Lidar Calibration:

In order to determine the (x,y) location of the user touch 108, the location of the lidar scanner 102 relative to the display screen 104 must be known. This can be achieved by measuring the location of the lidar scanner 102 upon installation (or at any later stage, e.g. to re-calibrate the system) and storing the measured location or installing the lidar scanner 102 at a predefined location. This typically required precise placement and rigid mountain of the lidar sensor 102.

An alternative method which allows for less accurate measurements during installation is the use of a calibration method, as illustrated by FIGS. 4, 5 and 5A-D.

Figure 4:
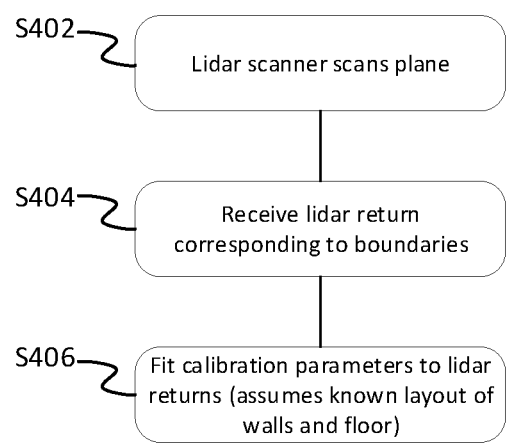
FIG. 4 is a flow diagram of an example process for calibrating the touchscreen device according to an embodiment of the present disclosure.

FIG. 4 shows a flowchart for a calibration method. At step S402, the lidar scanner 102 scans the detection plane 109. It is assumed at this point that no objects are presents, and that any lidar returns received at step S404 (calibration returns) are generated by the adjacent surfaces. For ease of understanding, the calibration of the front wall 104-F of FIG. 2 is described, based on lidar returns received at the front lidar sensor 102-F from the left and right walls 104-L, 104R. However, the same description applies equally to the calibration of the left and right walls 104-L, 104-R based on lidar returns from the front and back walls 104-F, 104-B, received at the left and right lidar sensors 102-L, 102-R.

Steps S402 and S404 are shown sequentially, but it will be appreciated that lidar returns are received as the scanning takes places. Lidar returns are accumulated over one or multiple sweeps of the lidar sensor 102-F for the purpose.

Step S406 uses knowledge of the layout of the walls to fit calibration parameters to the lidar returns received at step S406.

FIG. 5 is a schematic illustration of step S406. The intention is for the front lidar sensor 102-F to be located on the horizontal center line of the front wall 104-F, and oriented to that a vertical axis of the lidar sensor extends vertically downwards. However, the front lidar sensor 102-F is shown to be misaligned in both location and angle (the misalignment is exaggerated for the sake of illustration).

A set of calibration lidar point 500-F has been obtained by converting the calibration lidar returns to (x,y) coordinates, in an (x,y) coordinate system of the lidar sensor 102-F. An origin 508 of the sensor coordinate system corresponds to the location of the lidar sensor 102-F.

On the assumption that the left and right adjacent walls 104-F, 104-R lie substantially parallel to each other, and substantially perpendicular to the floor 107, two mutually parallel lines 506-L, 506-R (left and right wall lines) and a third line 506-F (floor line) perpendicular to both are fitted to the calibration lidar points 500-F. The lines are described by four calibration parameters in total:

x0: distance from origin 800 to the left wall line 506-L (left wall offset),
x1: distance from origin 800 scanner to right wall line 506-R (right wall offset),
y0: distance from origin to floor line 506-F (floor distance),
0: floor angle (or, equivalently, wall angle).

The above parameters encode a transformation from the sensor coordinate system to the normalized coordinate system of the front wall 104-F; any (x,y) point in the sensor coordinate system can now be transformed to normalized coordinates in the coordinate system of the front wall 104-F.

Figure 5A:
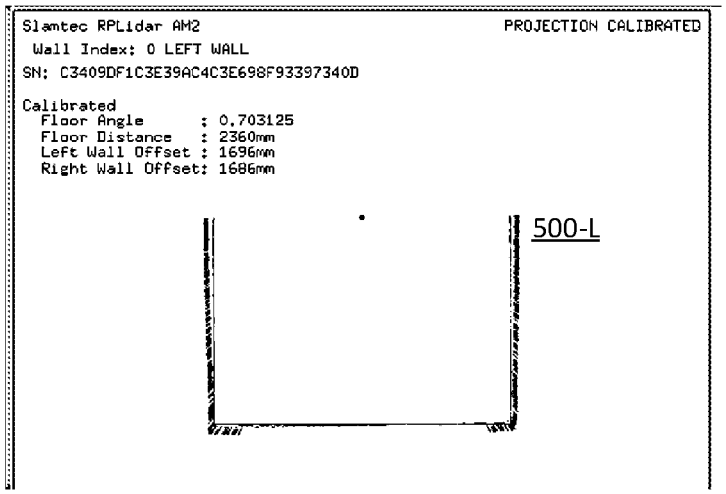
FIGS. 5A-C show example calibration result for three walls of an interactive room.
Figure 5B:
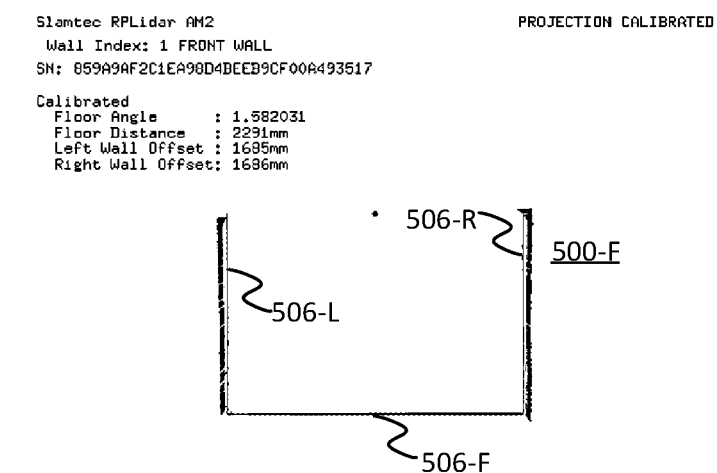
Figure 5C:
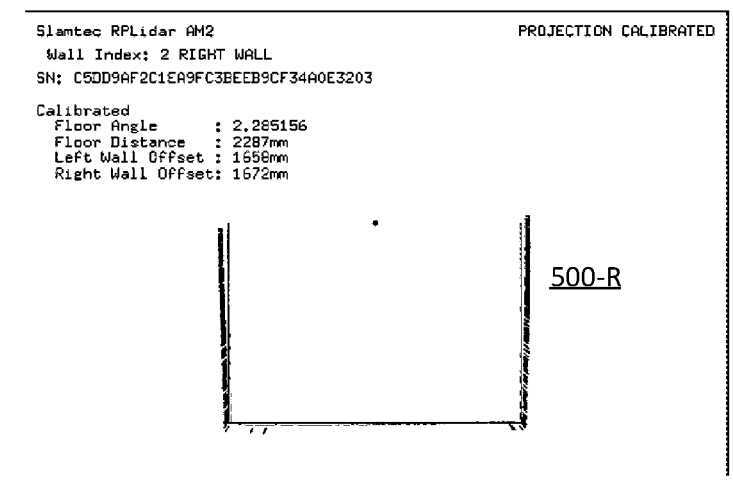

FIGS. 5A-C show example calibration results for all three interactive walls 104-L, 104-F, 104-R, as determined from respective calibration points 500-L, 500-F, 500-R. Note that, in the aforementioned figures, "LEFT WALL" and "RIGHT WALL" (capitalized) refer to the left and right walls 104-L, 104-R depicted in FIG. 2. By contrast, "Left Wall Offset" and "Right Wall Offset" are relative terms from the perspective of the wall in question (from the perspective of the LEFT WALL 104-F, the FRONT WALL 104-F is the right wall and the back wall 104-B is the left wall etc.).

In FIGS. 5A-5C, returns from the floor 107 are either not present or are limited. This is because the lidar data has been collected in a room with a floor that is mainly dark coloured and does not provide adequate reflection. As can be seen, this is not detrimental to the calibration process, as the floor line 506-F can be inferred from the points at which the wall returns terminate.

FIG. 5D shows a touch input detected at the RIGHT WALL 104-R using blob detection (here, reference numerals 506-L, 506-F, 506-R denote wall and floor lines previously fitted to the RIGHT WALL calibration points 500-R).

As indicated above, there are in fact two aspects to calibration. The first aspect—transforming to surface coordinates—is detailed above. The second aspect, briefly described earlier, is the transformation from surface coordinates to game coordinates.

To understand the rational for the second aspect, consider an image projected onto the wall 104 from an image projector 202 that is angularly misaligned relative to the wall. This causes the image to be "skid" in the sense that different image pixels occupy different sized regions of the wall (e.g. if the projector is slightly angled towards the left edge 103B of the wall 104 in FIG. 1, the width of image pixels on the wall will increase from left to right). The second calibration phase is used to compute the transformation from the surface 104 to the game environment. To do this, an image is displayed with a number of visible "targets" (e.g. crosses) having known (x,y) game coordinates, simultaneously or in succession. A user (e.g. technician) provides a touch input at each of the targets. The surface (x,y) coordinates of each touch inputs are computed as detailed above. Because the (x,y) game coordinates of the targets are known, the mapping between the (x,y) game coordinates of each visible target and the (x,y) surface coordinates of the corresponding touch input can be desired straightforwardly, thus providing a mapping from surface coordinates to game coordinates. Three visual targets are generally sufficient to fully compensate for horizontal and vertical skew.

As can be seen in FIGS. 5A-D, a small "buffer region" is provided, by locating the lines 506-L, 506-F, 506-R slightly inwardly from the detected returns. Blob detection is only applied to lidar points within the region defined by the lines 506-L, 506-F, 506-R, meaning that returns from the walls and floor (if any) are not considered. Alternatively, these points may be considered, but with the touch detection condition tuned so that the walls and floor do not trigger a detected touch input.

FIG. 5D shows a set of object lidar points 520 generated from an object. The object points 520 are close enough to be clustered together as belonging to the same object, and a circle 522 is fitted to the cluster of object points 522. This results in the detection of a touch input if the radius of the circle 522 is above the minimum and below the maximum radius.

FIG. 6 shows an example game which may be implemented on the game environment. FIG. 7 shows an example game rule database 700 which may be used when providing the game environment of FIG. 6.

At step S602, an image is displayed on the display screen 104 with a number of cards, each card showing a shape. In the example for FIG. 6, six cards are shown, with each card having either a star, a hexagon, or a cross. Two of the six cards have each of the three shapes.

At step S604, a new image is displayed on the display screen 104 in which the cards have been reversed such that the user can no longer see the shapes. The aim of the game is for the user to pair up matching cards from memory.

The user selects a first card by providing a user input at the location of the display screen 104 at which the first card is displayed.

The game engine accesses the game rules database 700 to determine the action to be triggered. Since the user has selected a first card, the triggered action is to turn over the selected card. The image is updated to display the first card shape side up, showing a star, and the updated image is displayed on the display screen 104, step S606.

The user selects a second card by providing a user input at the location of the display screen 104 at which the second card is displayed. Again, the game engine accesses the game rules database 700 to determine the action to be triggered.

If the user has selected the card matching the first card, in this example the other card with a star, the triggered action is turning the second selected card over, changing the colour of both of the now selected cards to green, and removing the cards from the game environment.

The image is updated based on the triggered action and displayed on the display screen 104. In the example of FIG. 6, the actions are triggered in two stages.

At the first stage, the second card is turned over and both cards are shown in green, step S608. At the second stage, the cards are removed, step S610. It will be apricated that each of the actions associated with the selected element may be implemented in separate steps, in a single step, or in any combination of steps.

If, instead, the user has selected a card which does not match the first card, in this example a card with a cross, the triggered action is turning the second selected card over, changing the colour of both of the now selected cards to red, and turning both cards back over so that no shape is visible to the user.

The image is updated based on the triggered action and displayed on the display screen 104. In the example of FIG. 6, the actions are triggered in two stages.

At the first stage, the second card is turned over and both cards are shown in red, step S612. At the second stage, the cards are turned back over, step S614.

The game rule database 700 also comprises a score associated with the selected element. During game play, a game score may be calculated by the game engine based on these scores. For example, when the user selects a first card, there is no change in score; if the user selects a matching card, the score increases by 10 points; and if the user selects a non-matching card, the score decreases by 5 points.

The game engine updates the game score with each user selection.

Figure 8:
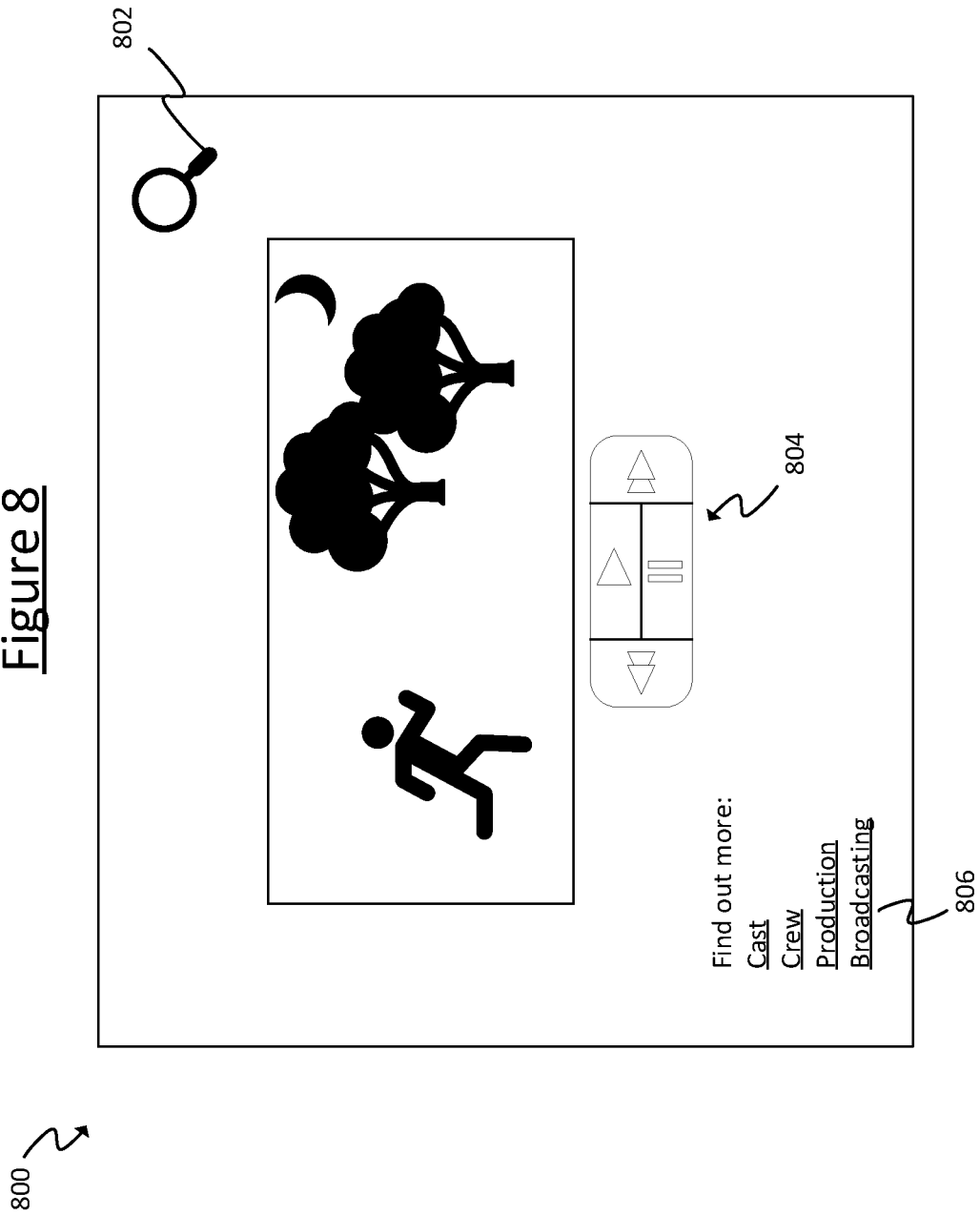
FIG. 8 shows an example user interface for providing an interactive video playback experience using the touchscreen device.

The lidar touchscreen 100 may be used to provide the user with any interface with which the user can interact. FIG. 8 shows an example video playback environment 800. FIG. 9 shows an example rule database 900 which may be implemented with the video playback environment 800.

The video playback environment 800 comprises user selectable elements for controlling video playback (video playback controls 804), searching for videos (search icon 802), and accessing information pages (hyperlinks 806).

When the user provides a user input at the location of one of the user selectable elements 802, 804, 806 at the display screen 104, the game engine 1006 accesses the rules database 900 and determines the actions to be triggered.

If the user selects a play button, which is one of the video playback controls 804, the game engine 1006 triggers the video to play. If the user selects a pause button, another of the video playback controls 804, the game engine 1006 triggers the video to pause.

If the user selects the search icon 802, the game engine 1006 triggers a search input interface to be rendered. The game engine 1006 updates the image to include the search input interface and provides the updated image to for displaying on the display screen 104.

If the user selects one of the hyperlinks 806, the game engine 1006 triggers a page linked via the hyperlink to be rendered. The image is updated to comprise the linked page, and is displayed on the display screen 104.

FIG. 10 shows a display system 1004, such as the arrangement of image projectors 202 in FIG. 1, coupled to at least one lidar scanner 102. The touch input detector 1002 is shown coupled to the game engine 1006 and lidar scanner 102, and the calibration component 504 of FIG. 5 is shown as a component of the touch input detector 1002. The touch input detector 1002 can, by virtue of the two-stage calibration, provide touch input to the game engine 1006 in (x,y) game coordinates for mapping onto interactive game elements that are also represented in (x,y) game coordinates. In addition, a motion capture system 170 is depicted, coupled to the game engine 1006 and one or more image capture devices 172 located in the room (not shown in FIG. 2). To interact with the game, a combination of touch input and motion capture is used. To control certain game elements, users move within the room, and touch inputs are used to control other game elements.

FIG. 11 shows a schematic view of a computing device 100 which may be used for example for implementing the game engine 1006 and touch detector 1002. The computing device 1100 has a controller 1122. The controller 1122 may have one or more processors 1104 and one or more memories 1110. For example, a computer code of executing the interactive user experience on the computing device 1100 may be stored in the memory 1110, along with the rule databased 700, 900 and/or session metadata generated during the interactive session. The controller 1122 is also shown as having a graphics controller 1106 and a sound controller 1112. It should be appreciated that one or other or both of the graphics controller 1106 and sound controller 1112 may be provided by the one or more processors 1104. Other functional blocks may also be implemented by suitable circuitry or computer code executed by the one or more processor 1104.

The graphics controller 1106 is configured to provide a video output 1108 to the image provider 1004. The sound controller 1112 is configured to provide an audio output 1114. The audio output 1114 may be provided to an audio device 1120 such as a speaker and/or earphones(s). The controller 1122 has a network interface 1116 allowing the device to be able to communicate with a network such as the Internet or other communication infrastructure.

The device 1100 may have an input device 1102. The input device 1102 can take any suitable format such as one or more of a keyboard, mouse, touch screen, joystick or game controller, and includes the lidar scanner 102.

The blocks of the controller 1122 are configured to communicate with each other via an interconnect such as a bus or any other suitable interconnect and/or by point to point communication.

It should be appreciated that, in some embodiments, the controller 1122 may be implemented by one or more circuits, at least in part.

It should be appreciated that embodiments may be deployed in different system architectures. For example, the interactive user experience may be implemented as an interactive experience that is stored in the memory 1110 of the computing device 1100. However, when in an online mode, at least part of the interactive experience may be provided by an interactive experience server. By way of example only, a Java game applet may be provided to the computing device 1100 and the locally running Java applet will generate, for example, the graphics, sounds, and user interaction for the interactive experience on the computing device 1100. The Java applet can have sufficient information to allow offline usage when the computing device 1100 is no longer in communication with the interactive experience server, e.g. if connectivity is lost.

In some embodiments, the game may be implemented as a computer program that is stored in a memory system, for example the interactive experience server, and which runs on the processor of the interactive experience server. Data streams or updates are supplied to the computing device 1100 to allow the computing device 1100 to render and display graphics and sounds in a browser of the computing device 1100.

The invention claimed is:

1. A frameless touchscreen display system, comprising:
a frameless display screen;
a display system arranged to render a moving image within a display area of the frameless display screen;
an image rendering component configured to receive a detected touch input,
determine an action associated with a location of the detected touch input within the display area, and modify the moving image to effect the associated touch action;
a 2D lidar sensor positioned so that a detection plane of the 2D lidar sensor lies adjacent and substantially parallel to the frameless display screen; and
a touch input detector coupled to the 2D lidar sensor and configured to: detect the touch input based on one or more object lidar returns from an object intersecting the detection plane at said location within the display area, and estimate said location within the display area based on (i) a return time and return angle of each object lidar return and (ii) a known position of the 2D lidar sensor relative to the frameless display screen.

2. The frameless touchscreen display system of claim 1, wherein the display system is arranged so that the display area extends all the way to an outer edge of the frameless display screen.

3. The frameless touchscreen display system of claim 2, wherein the outer edge of the frameless display screen meets a second surface extending outwardly from the frameless display screen, such that the display area extends all the way to the second surface.

4. The frameless touchscreen display system of claim 3, comprising:
a calibration component configured to detect an intersection of the second surface with the detection plane of the 2D lidar sensor based on a set of calibration lidar returns from the second surface, and determine said known position of the 2D lidar sensor from the detected intersection, wherein lidar returns from the second surface are disregarded in detecting touch input.

5. The frameless touchscreen display system of claim 4, comprising:
a second 2D lidar sensor positioned so that a second detection plane of the second 2D lidar sensor lies adjacent and substantially parallel to the second frameless display screen, the touch input detector coupled to the second 2D lidar sensor for detecting a touch input within a location of the second display area based on a known position of the second 2D lidar sensor.

6. The frameless touchscreen display system of claim 5, wherein the calibration component is configured to detect a second intersection of the first frameless display screen with the second detection plane of the second 2D lidar sensor based on a second set of calibration lidar returns from the first frameless display screen, and determine said known position of the 2D lidar sensor from the detected second intersection.

7. The frameless touchscreen display system of claim 4, wherein the display system is arranged so that the display area extends all the way to at least two or three outer edges of the frameless display screen, wherein the calibration component is configured to detect respective intersections of the two or three outer edges with the detection plane based on respective sets of lidar returns from at least two or three second surfaces extending outwardly from said two or three outer edges of the display screen.

8. The frameless touchscreen display system of claim 3, wherein the frameless display screen is a first frameless display screen and the display area is a first display area, and wherein the second surface is a second frameless display screen, on which the display system is configured to display a second moving image in a second display area that extends to meet the first display area at said outer edge of the first frameless display screen.

9. The frameless touchscreen display system of claim 8, wherein the image rendering component is configured to display the first and second moving images as adjacent portions of a single larger image, the display system calibrated such that the single larger image spans the first and second display areas unbroken, with image content moving between the first and second moving images.

10. The frameless touchscreen display system of claim 1, comprising:
at least one image capture device; and
a motion capture component coupled to the at least one image capture device configured to detect and track one or more known target objects in image data received from the at least one image capture device, wherein the image rendering component is configured to modify the moving image based on the detected touch input and the tracking of the known target objects.

11. The frameless touchscreen display system of claim 10, wherein the at least one image capture device and the motion capture component are arranged to track the known target objects in a horizontal plane, the frameless display screen extending upwards from the horizontal plane, whereby the moving image is controllable via a combination of touch input at the first frameless display screen and movement of the known target objects within the horizontal plane.

12. The frameless touchscreen display system of claim 1, wherein the moving image is a real moving image displayed within the available display area, wherein the display system comprises an image projector positioned to project the moving image onto the display area of the frameless display screen.

13. The frameless touchscreen display system of claim 1, wherein the touch input detector is configured to fit a predetermined shape to the object lidar returns, the touch input detected by determining that the predetermined shape satisfies one or more touch detection criteria.

14. The frameless touchscreen display system of claim 13, wherein the one or more touch detection criteria require a size of said shape to exceed a minimum size without exceeding a maximum size.

15. A method of calibrating a 2D lidar sensor, the method comprising:
processing a set of calibration lidar returns detected by the 2D lidar sensor, in order to estimate a position of the 2D lidar sensor relative to a first surface;
wherein the 2D lidar sensor is assumed to be positioned such that a detection plane of the 2D lidar sensor lies adjacent and substantially parallel to the first surface for detecting touch input at the first surface, with at least one second surface extending outwardly from at least one outer edge of the first surface such that the second surface intersects the detection plane, wherein the position of the 2D lidar sensor is estimated by fitting at least one line or curve to the calibration lidar returns in a frame of reference of the 2D lidar sensor, the line or curve representing the intersection(s) between the first and second surface(s).

16. The method of claim 15, comprising:

causing a display system to render multiple visible elements on the first surface, the multiple visible elements having known coordinates in an interaction coordinate system;

detecting a calibration touch input at each of the multiple visible elements, the calibration touch input detected as one or more object returns from an object intersecting the detection plane at a location of the visible element;

determining surface coordinates of each touch input in a coordinate system of the first surface, based on the estimated position of the 2D lidar sensor relative to the first surface;

using the surface coordinates of each touch input to determine a transformation from the surface coordinate system to the interaction coordinate system, based on the known coordinates of each visible element.

17. The method of claim 16, wherein the visible elements are projected onto the visible display area by at least one image projector of the display system, said transformation for compensating for any angular misalignment between the image projector and the first surface.

18. A computer system comprising:

a touch input detector for coupling to a 2D lidar sensor positioned so that a detection plane of the 2D lidar sensor lies adjacent and substantially parallel to a surface, wherein the touch input detector is configured to detect touch inputs for interacting with interactive elements rendered by an interactive application component, the interactive elements represented in an interaction coordinate system;

wherein the touch input detector is configured to:

detect a touch input at the surface based one or more object returns from an object intersecting the detection plane, estimate a location of the touch input relative to the surface based on (i) a return time and return angle of each object lidar return and (ii) a known position of the 2D lidar sensor relative to the surface, and provide, to the interactive application component, coordinates of the detected touch input in said interaction coordinate system, the coordinates determined by estimating the location of the touch input relative to the surface.

19. The computer system of claim 18, wherein the touch input detector is configured to estimate the location of the touch input in a coordinate system of said surface based on (i) and (ii), and transform the location of the touch input in the coordinate system of the surface to the coordinates in the interaction coordinate system based on a known transformation between the surface coordinate system and the interaction coordinate system.

20. The computer system of claim 18, comprising:

a 2D lidar sensor coupled to the touch input detector and positioned so that the detection plane of the 2D lidar sensor lies adjacent and substantially parallel to a surface for detecting touch inputs at the surface.

* * * * *

UNITED STATES PATENT AND TRADEMARK OFFICE
CERTIFICATE OF CORRECTION

| | |
|---|---|
| PATENT NO. | : 11,467,695 B1 |
| APPLICATION NO. | : 17/447925 |
| DATED | : October 11, 2022 |
| INVENTOR(S) | : William Thomas Dean et al. |

It is certified that error appears in the above-identified patent and that said Letters Patent is hereby corrected as shown below:

On the Title Page

Column 1, Line 2, under item (22) Filed, below "Sep. 16, 2021" insert --Jun. 17, 2021 (GB) 2108685.5--, as a new field entry.

In the Specification

In Column 13, Line 39, delete "0:" and insert --$\theta$:--.

Signed and Sealed this
Fourteenth Day of February, 2023

Katherine Kelly Vidal
*Director of the United States Patent and Trademark Office*